United States Patent [19]
Björkman

[11] Patent Number: 5,243,179
[45] Date of Patent: Sep. 7, 1993

[54] LASER WARNING DEVICE WITH DIVIDING AND FILTERING OF THE INCIDENT BEAM

[75] Inventor: Bengt Björkman, Järfälla, Sweden

[73] Assignee: NobelTech Electronics AB, Jarfalla, Sweden

[21] Appl. No.: 858,153

[22] Filed: Mar. 27, 1992

[30] Foreign Application Priority Data
Mar. 27, 1991 [SE] Sweden ............................ 9100916-7

[51] Int. Cl.$^5$ ........................ H01J 5/16; G01B 11/26
[52] U.S. Cl. .................... 250/206.2; 250/216;
250/214 RC; 250/227.11; 250/226; 356/152
[58] Field of Search ............ 250/227.23, 216, 227.11,
250/206.1, 206.2, 203.3, 203.6, 226, 214 RC;
385/12; 356/141, 152

[56] References Cited

U.S. PATENT DOCUMENTS

| | | | |
|---|---|---|---|
| 4,303,855 | 12/1981 | Bapst et al. | 250/226 |
| 4,616,137 | 10/1986 | Goff et al. | 250/227.23 |
| 4,625,108 | 11/1986 | Nestel et al. | 250/227 |
| 4,682,024 | 7/1987 | Halldorsson et al. | 250/227.11 |
| 4,785,170 | 11/1988 | Witt | 250/226 |
| 4,868,378 | 9/1989 | Biverot | 250/206.1 |
| 4,968,879 | 11/1990 | Clark | 250/227.11 |
| 5,011,265 | 4/1991 | Tamamura et al. | 359/629 |
| 5,015,844 | 5/1991 | Cole | 250/227.24 |
| 5,087,811 | 2/1992 | Schweizer et al. | 250/227.23 |

FOREIGN PATENT DOCUMENTS 2838932 3/1980 Fed. Rep. of Germany .
3400837 3/1985 Fed. Rep. of Germany .

Primary Examiner—David C. Nelms
Assistant Examiner—Michael Messinger
Attorney, Agent, or Firm—Pollock, Vande Sande & Priddy

[57] ABSTRACT

A laser warning device for sector-by-sector surveillance of the air space, comprises a plurality of module sections such that each surveyed sector is coupled through an optical antenna and an optical buffer to a module section. Each module section includes an optical fiber input for receiving a beam of light transmitted through the optical fiber, elements for dividing the transmitted beam of light into at least a first and a second part beam, at least a first and a second optical fiber path for transmitting the first and second part beam respectively, filters provided in the first fiber path for filtering the first part beam to a narrow band beam first detector for detecting the filtered first part beam and delivering a signal representing the amplitude of the filtered first part beam, second detector for detecting the second part beam and for delivering a signal representing the amplitude of the second part beam and an electronic unit for summing the signals from the first and second detector and for comparing the summed signal value with a threshold value.

12 Claims, 4 Drawing Sheets

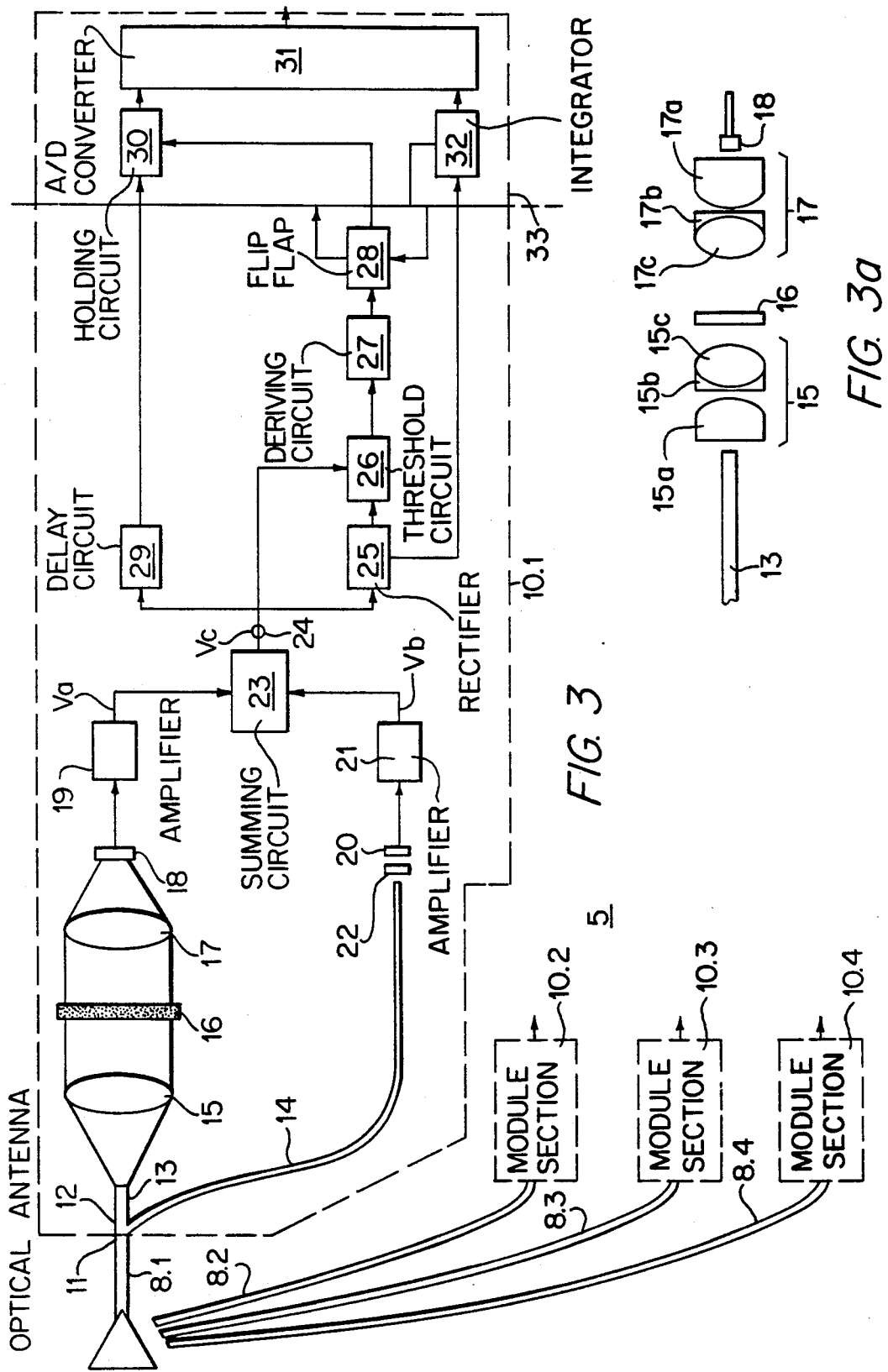

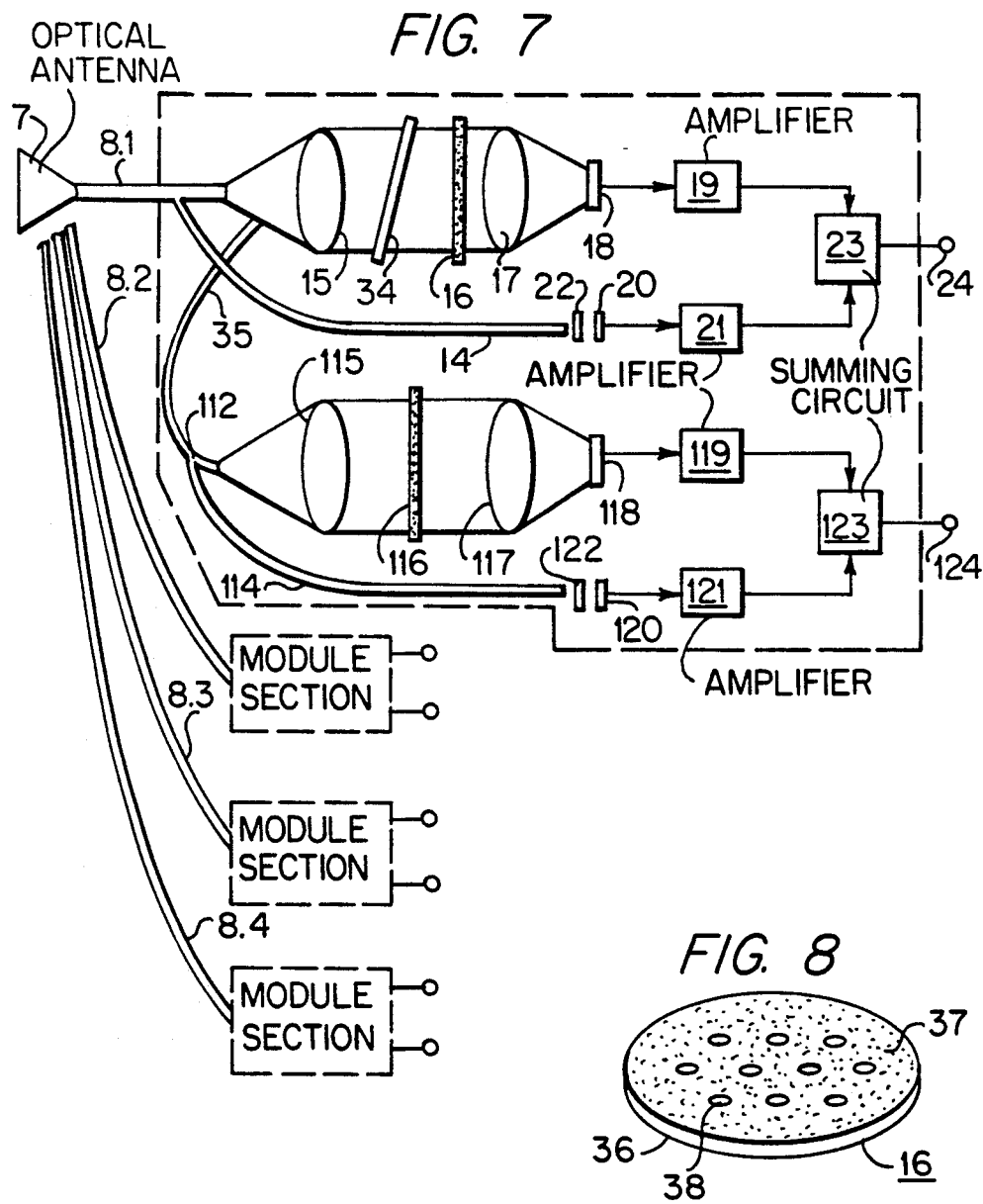
FIG. 7
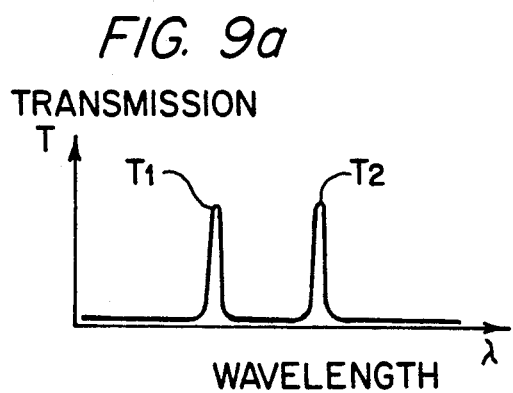
FIG. 8
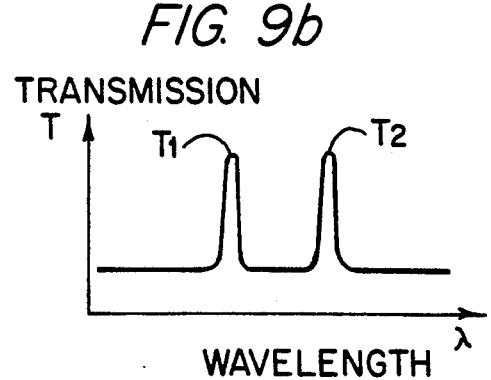
FIG. 9a
FIG. 9b

LASER WARNING DEVICE WITH DIVIDING AND FILTERING OF THE INCIDENT BEAM

FIELD OF THE INVENTION

The present invention relates to a laser warning device for sector-by-sector surveillance of the air space and with pulsed and/or continuous reception comprising optical antennas, optoelectronic signal conversion and electronic signal evaluation. The invention also provides a module suitable for use in such a laser warning device.

BACKGROUND OF THE INVENTION

On the basis of the sector-by-sector surveillance, a direction in incidence of a beam of light rays can be determined as being in the range of directions of incidence of the sector most strongly illuminated. Another method is for amplitude values for several sectors to be weighted and the angle of incidence to be determined. The last-mentioned method provides for more accurate determination of the angle of incidence. The operation of the laser warning device is determined by, among others, the antenna. The antenna can be of the sector type, angle type or rotating type. The position of the laser can be determined by sector or angle.

Surveillance of air space with respect to laser light is of greatest importance in order to be able to set up countermeasures against any threat. A laser warning device is therefore used partly in mobile objects such as airplanes, helicopters, armed vehicles and craft, and partly in stationary installations such as, for example, bridges and bunkers.

At present, known laser warning devices of the above type are broad band devices. The broad band width of the laser warning devices implies, at least theoretically, that laser light can be discovered within a wide range of wavelengths. However, broad band laser warning devices are disturbed by various phenomena such as direct or diffuse sunlight, lightning discharges and so forth.

SUMMARY OF THE PRESENT INVENTION

It is an object of the present invention to produce a laser warning device having high sensitivity within a limited range of wavelengths and which is not disturbed by sunlight or other phenomena.

It is another object of the present invention to produce a laser warning device which is compact and simple in its construction and can therefore be produced at a low cost and, at the same time, is flexible.

The above objects are achieved by means of a laser warning device, in which each sector surveyed is coupled via an optical antenna and an optical fiber to a module section comprising an optical fiber input for receiving an incident of light rays through the optical fiber, means for dividing the incident beam of light rays into at least a first and a second part beam, means for filtering the first part beam to form a narrow band light beam, means for detecting the filtered part beam and the second part beam, and an electronic unit allocated to the detection means, which is coupled to a central evaluating unit. Through filtering the incident light, only laser light within a limited wavelength range is considered, preferably with wavelengths of an order of magnitude of $\mu m$, for example 0.5-1.1 $\mu m$, 1.1-1.6 $\mu m$, 2.8-5 $\mu m$ and/or 8-12 $\mu m$. This limiting of the range of wavelengths is to ensure that light from certain types of laser beam sources remains undetected. When evaluating which types of laser beam sources are used or will be used within the foreseeable future, it appears that a relatively narrow range of wavelengths is sufficient for capturing the light from the conceivable laser beam sources. The clearly dominating laser beam source appears to be the Nd:YAG laser and a suitable wavelength interval for laser warning devices is 0.5-1.1 $\mu m$. A preferred embodiment of the laser warning device of the present invention is therefore characterized by the fact that the optical filter has a pass band for light within the range of wavelengths of 0.5-1.1 $\mu m$. In the event that future ranges of laser wavelength are found to be different, the laser warning device, due to its flexibility, is easily convertible to other ranges of wavelength. It should therefore be able to manage, for example, dazzling lasers with sliding wavelength which are expected to come into use in the 90s.

The effect of direct or diffuse light is reduced to a virtually harmless level and the amplifier noise generated in the electronic unit becomes more easily manageable. As a result, the sensitivity of the laser warning device can be increased, resulting in the possibility of surveying greater ranges from one sensing point. Effective signal processing methods with threshold comparisons, for example CFAR (Constant False Alarm Rate), can be used for distinguishing any laser light from noise or other disturbances. Dividing the incident beam of laser light into two part beams increases the dynamic range of a module section.

A number of module sections are advantageously combined to form a group for forming a module, the module having a common coupling to the central evaluating unit. Collecting several module sections to form one module results in a very compact unit which is therefore relatively easy to place even if the space is limited, and which can be produced at a low cost. This module concept gives the laser warning device great flexibility which makes it applicable, both, in simple and in advanced applications. The number of laser modules included can be selected in accordance with the current need for obtaining an acceptable coverage of the object to be protected and accuracy in the surveillance.

A module suitable for use in a laser warning device as above is characterized by a number of module sections, each of which comprises an optical fiber input for reception of an incident beam of optical fiber rays, means for dividing the incident beam of optical fiber rays into at least a first and a second part beam, means for filtering the first part beam into a narrow band beam of light rays, means for detecting the filtered part beam and the second part beam, and an electronic unit allocated to the detection means. Dividing the incident beam of light rays into part beams and the subsequent filtering provide the module with great sensitivity within a limited range of wavelengths and it is not affected by different light.

According to an advantageous embodiment of the module, a first lens arrangement causes the first part beam to fall against filtering means as a parallel beam and a second lens arrangement causes the first part beam to fall against a detector after filtering. The optical fiber input comprises a first lens arrangement which converts the incident first part beam to a parallel beam and the means for detecting the filtered part beam comprise a detector and a second lens arrangement, which second lens arrangement refracts the incident, filtered and parallel part beam towards the detector.

To increase the dynamic range of the module further, the means for detecting the second part beam can comprise an attenuator according to another advantageous embodiment. In this embodiment the means for detecting the second part beam comprise a detector and an attenuator arranged in front of the detector.

According to a further advantageous embodiment, the first part beam is divided with respect to wavelength by a dichroic mirror into a transmitted part beam with wavelengths on one side of a limit wavelength and a reflected part beam with wavelengths on the other side of the limit wavelength. Due to this dividing, one type of detector can be used for detecting the transmitted part beam and a second type for detecting the reflected part beam. For example, silicon detectors can be used for wavelengths below 1.1 μm and indium-gallium-arsenide detectors for wavelengths above 1.1 μm. A suitable limit wavelength for the dichroic mirror is therefore 1.1 μm for the specified detector types. In this embodiment at least one of the relevant module sections comprises a dichroic mirror arranged between the optical fiber input of the module section and means for filtering of the first part beam, which dichroic mirror transmits the beam of light rays belonging to the range on one side of a limit wavelength towards means for filtering and reflects the beam of light rays belonging to the range on the other side of the limit wavelength towards further means for filtering.

The means for filtering advantageously consist of a filter with a number of narrow band transmission ranges. According to a simple embodiment of the module, the filter has a narrow band transmission range. When there is more than one transmission range, one of the transmission ranges can be reserved for use during adjustment and checking of a module and particularly on installation of the module. Other transmission ranges can be placed in such a manner that the module covers wavelengths which will be used.

Hereinbelow, the present invention will be described in greater detail with reference to the attached drawings, in which:

BRIEF DESCRIPTION OF THE DRAWINGS

FIG. 3 shows diagrammatically a laser warning module according to the present invention;

FIG. 3a shows a lens arrangement suitable for use in a laser warning module according to FIG. 3;

FIG. 7 shows diagrammatically a laser warning module according to the present invention with division of the beam of rays into two wavelength ranges by means of a dichroic mirror;

FIG. 8 shows an example of an optical filter for use in a laser warning module according to FIGS. 3 or 7;

FIGS. 9a and 9b show the transmission of a filter as a function of the wavelength for a conventional filter and, a filter according to FIG. 7 respectively.

DETAILED DESCRIPTION OF THE PREFERRED EMBODIMENTS

Figure 1:
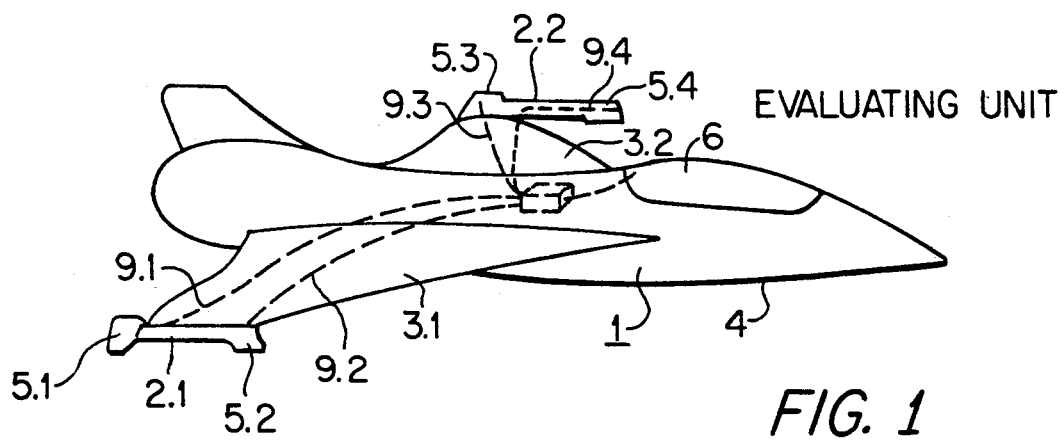
FIG. 1 shows an example of a placement of a laser warning device according to the present invention in an airplane.

In the embodiment shown in FIG. 1, optical antennas and modules incorporated in the laser warning device are placed in weapon spars 2.1, 2.2 of the wings 3.1, 3.2 of an airplane 1, a central evaluating unit 6 being placed in the fuselage 4. The central evaluating unit 6 is electrically connected to the modules 5.1–5.4 via electric lines 9.1–9.4. The airplane shown is provided with four modules 5.1–5.4, one module being arranged at each end of a weapon spar on each side of the fuselage 4.

Figure 2:
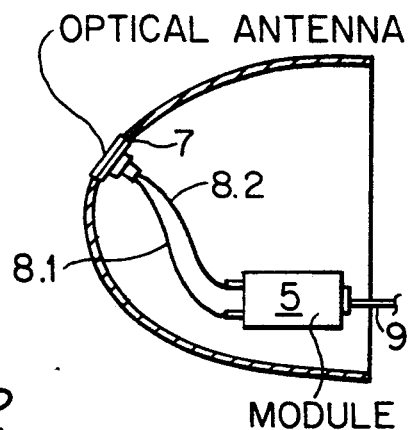
FIG. 2 shows a space in the plane within which a module, which forms part of the laser warning device according to the invention, is housed.

FIG. 2 shows how a module 5 and an optical antenna 7 are housed in a space in connection with the end of a weapon spar 2.1 or 2.2. One end of the module 5 is connected to the optical antenna 7 through optical fibers 8.1, 8.2 while the other end of the module is connected to the central evaluating unit 6 via an electric line 9.

FIG. 3 shows diagrammatically a laser warning module 5 formed by four module sections 10.1–10.4, the reference number to the left of the point referring to a random module section whereas the reference number to the right of the point defines the individual module section. The principle of designation is applied hereinbelow to components, incorporated in the module sections. An optical fiber input 11 in each module section is optically connected to an optical antenna 7 via associated optical fiber 8.1–8.4. Means 12 for dividing up the beam of light rays transmitted through the optical fiber input are arranged following the optical fiber input 11 of the respective module section 10.1–10.4. In the embodiment shown, means for producing a division of the beam of light rays are implemented by a number of optical fibers in the optical wave guide being branched off for forming a separate optical wave guide. The optical fibers not branched off form an optical wave guide 13 for a first part beam while the optical fibers branched off form an optical wave guide 14 for a second part beam. Other means for dividing up the beam of light rays are possible. For example, prisms or other optical elements such as semi-transparent mirrors can be used.

At the end of the optical wave guide for the first part beam, a first lens arrangement 15 is provided for converting the first part beam to a parallel beam. In the figure, the lens arrangement is shown as a single lens but it can be advantageously constructed as an arrangement comprising several lenses, for example as shown in FIG. 3a and described later. A narrow band filter 16 is arranged in the beam path for the parallel beam. The filter 16 transmits light with wavelengths of the order of magnitude of μm, for example 0.6–1.1 μm, which are suitable for detecting laser light from the normally occurring Nd:YAG laser. The filtered first part beam passes a second lens arrangement 17 which refracts the beam towards a detector 18. Similar to the first lens arrangement, the second arrangement can consist of several lenses as shown in FIG. 3a. The detector 18 is coupled to an amplifier 19.

The optical wave guide 14 for the second part beam conducts the light towards a detector 20 followed by an amplifier 21. An attenuator 22, preferably in the form of an attenuating layer, is arranged between the end of the optical wave guide 14 and the detector 20. The attenuator 22 has the task of increasing the dynamic range of the laser warning module. The outputs of the amplifiers 19 and 21 are coupled to a summing circuit 23 which provides a sum signal in the form of a voltage at output 24 of the summing circuit 23. A high level of the sum signal indicates the presence of laser light within the sector surveyed.

According to the lens arrangement shown in FIG. 3a, which is incorporated in a laser warning module, the first lens arrangement 15 is constructed of three lenses. Counting from the input side, there is a positive single lens 15a, and achromatized double lens 15b, 15c. The second lens arrangement 17 is similarly constructed of three lenses of the types specified but arranged in the reverse order counting from the input side and turned in the opposite direction, that is to an achromatized double lens 17b, 17c and a positive single lens 17a.

Figure 4:
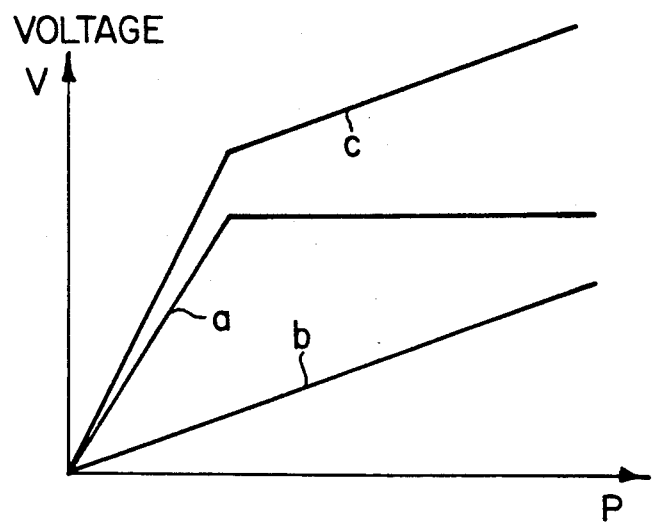
FIG. 4 shows a curve diagram of voltages at the output of an amplifier incorporated in the laser module according to FIG. 3, as a function of incident power.

The diagram of curves in FIG. 4 shows voltages V at the output side of the amplifiers shown in FIG. 3, as a function of incident power P. Curve a relates to the voltage $V_a$ at the output of amplifier 19, curve b to voltage $V_b$ at the output of amplifier 21 and curve c to voltage $V_c$ at the output 24 of the summing circuit 23, which is the sum of the voltages according to curves a and b. In curve a, the voltage increases linearly with incident power up to a limit value which can be in the order of magnitude of $A \times 40$ kW, where A is the area of the optical wave guide expressed in $m^2$. Beyond this limit value, the voltage is mainly constant. The voltage at the output of the amplifier 21 according to curve b similarly increases linearly with incident power. By branching of a limited part of the incoming light and possibly attenuating it further in the attenuator 22 shown in FIG. 3, however, the voltage increases significantly slower than that in curve a and the limit value at which the voltage increase stops is therefore shifted to a high-power range without direct interest to the laser warning device design according to the invention. Summing the voltages according to curves a and b provides curve c which shows two different linear characteristics for the voltage increase as a function of incident power. The first part of curve c with a steeper slope indicates a high sensitivity of the laser warning device, while the flatter part in combination with the steeper slope indicates a wide dynamic range.

In the text following, the remaining part of the electronic unit contained in a module section according to FIG. 3 is described with reference to FIGS. 3 and 5.

Figure 5A:
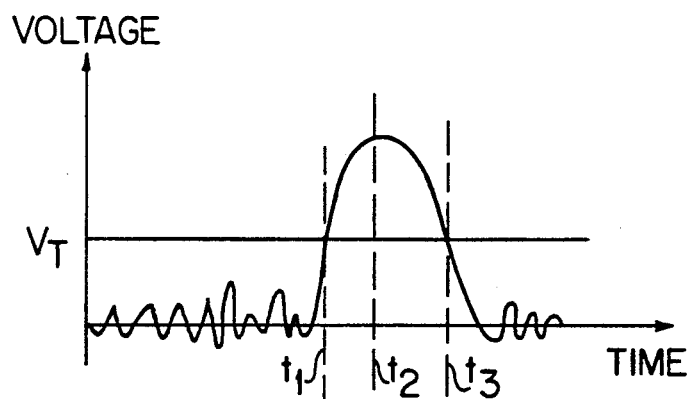
FIGS. 5a, 5b and 5c show signal forms occurring in the electronic unit of a module section incorporated in a laser warning module according to FIG. 3.
Figure 5B:
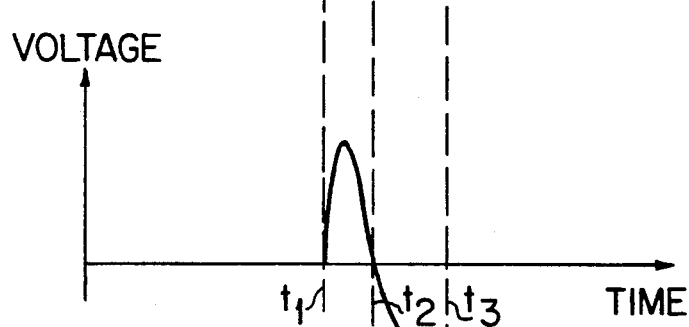
Figure 5C:
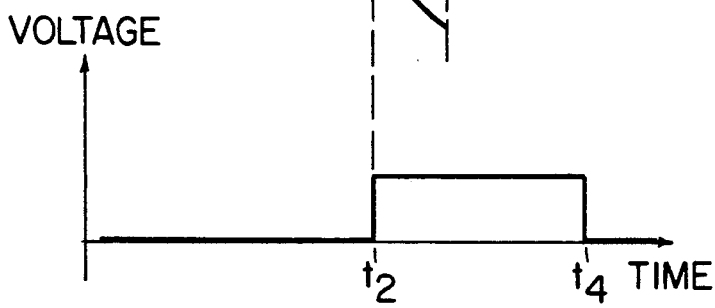

FIG. 5a shows an example of the possible appearance of the voltage at the output 24 of the summing circuit 23. In the curve shown, a light pulse can be distinguished in the time interval $t_1$-$t_3$ by using a threshold value $V_T$. For the rest, the curve only contains noise.

A rectifier 25 rectifies the output signal from the summing circuit 23. The rectified voltage is supplied to a threshold circuit 26 in which a threshold value $V_T$ is set in dependence on the rectified voltage, preferably a multiple of the voltage. The threshold value is then compared with the output signal of the summing circuit (23). The threshold comparison follows the known CFAR principle. The voltage signal is derived in a deriving circuit 27 and a derived signal with a zero transmission at time $t_2$ according to FIG. 5 is obtained. A flipflop 28 generates a pulse when the derived signal passes through zero from a positive value, that is to say at time $t_2$. The pulse from the flipflop stops at time $t_4$.

The output signal of the summing circuit 23 is also supplied to a delay circuit 29 and a holding circuit 30. The delay circuit 29 delays the output signal from the summing circuit by an amount corresponding to the delay caused by the rectifier 25, the threshold circuit 26, the deriving circuit 27 and the flipflop 28. The holding circuit 30 has the task of holding, during the time that the flipflop 28 is outputting a pulse, the value which is currently present at the input of the holding circuit when the front edge of the pulse output by the flipflop occurs, that is the instantaneous value of the signal at time $t_2$. In this way, the holding circuit is locked to the maximum amplitude value of the signal. This amplitude value is converted from analog to digital form in an A/D convertor 31 and is then transferred to a central evaluating unit, which is preferably in the form of a computer. On the basis of the signal rectified in the rectifier 25, a measure of the duration of a light pulse can be obtained. This duration measure is obtained by integrating the rectified signal on the occurrence of a pulse, carried out in the integrator 32, and then dividing the area obtained by the amplitude value obtained. The last-mentioned division is expediently carried out in the central evaluating unit after first having analog/digital-converted the integrated signal in the A/D convertor 31.

A line 33 connects the module sections within a module and possibly also a number of modules. Among others, the switching-off of flipflops having the task described with reference to flipflop 28 is controlled via line 33. In the case where a flipflop has been recently activated, it is ensured that all remaining flipflops with corresponding tasks are kept switched off for an interval of time.

On the basis of the digital information items transferred to the central evaluating unit via the A/D convertor 31, the evaluating unit can determine the angle of incidence or range of angles of incidence and type of a beam of light rays. According to one method, the direction of incidence of a beam of light rays is established to belong to the range of directions for the sector which has received the highest amplitude value. The direction can also be determined by a joint weighting of the received amplitude values with reference to the ranges or direction of incidence of the respective sectors. Utilizing the area information items transmitted, a measure of the pulse width of a beam of light rays can also be determined by dividing the area by the amplitude.

Figure 6A:
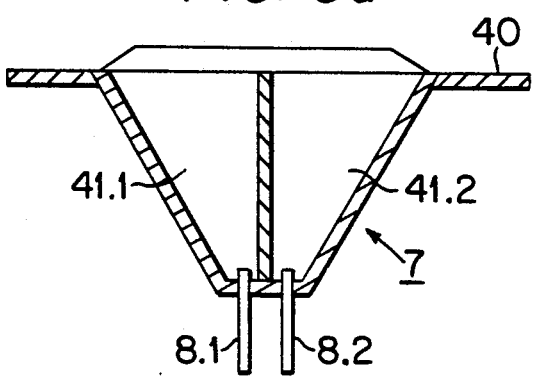
FIGS. 6a and 6b show examples of an optical antenna suitable for use in the laser warning device according to the present invention in a side view section (FIG. 6I); and a top view (FIG. 6b)
Figure 6B:
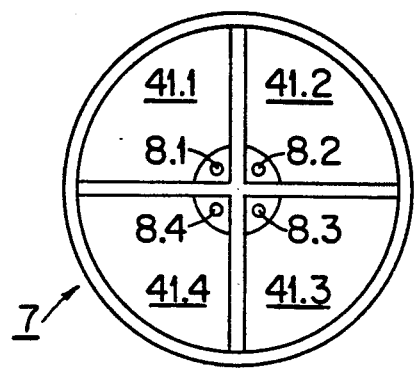

FIGS. 6a and 6b show examples of an optical antenna 7 suitable for use in conjunction with the laser module. In the embodiment shown, the antenna 7 is shown mounted down in a housing 40 defining a space in connection with a weapon spar. As shown most clearly in FIG. 5b, the antenna 7 is divided into four receiving sections 41.1-41.4 having a pyramid-like or conical shape. The four receiving sections together form a conical shape. Optical fiber conductors 8.1-8.4 enter in at the tip of the receiving sections and are each coupled to a module section 10.1-10.4. To increase the beam width of the fiber conductors, the ends can be each provided with a negative lens (not shown), bonded to the end of the optical wave guide.

The laser warning module shown in FIG. 7 is a further development of the laser warning module described with reference to FIG. 3. Apart from dividing the incident beam of light rays into a first and a second part beam, the laser warning module is arranged to divide the incident beam of light rays into two beams of light rays on the basis of wavelength. Corresponding components in FIG. 7 have been given the same reference designations and, where doubled, have been preceded by a number 100. Dividing the beam of light rays on the basis of wavelength is carried out with the aid of a dichroic mirror 34 arranged in the beam path between the first lens arrangement and the filter 16. The dichroic mirror is transparent to wavelengths below a certain wavelength, for example 1.1 μm. Light with wavelengths above this wavelength is reflected. The reflected light is conducted via an optical wave guide 35 to a branch 112 where preferably a lesser part is branched off to an attenuator 122 and a detector 120. The part of the light not branched off passes through a lens arrangement 115, a filter 116 and a lens arrangement 117 before it reaches a detector 118. An amplifier 119 amplifies the signal detected by the detector 118 while an amplifier 121 amplifies the signal detected by the detector 120. The output signal of the amplifiers 119 and 121 is summed in a summing circuit 123. In the embodiment now described, the detectors 18 and 20 can consist of silicon detectors, suitable for wavelengths below 1.1 μm, while the detectors 118 and 120 can be made of indium-gallium-arsenide detectors suitable for higher wavelengths. For the further signal processing in an electronic unit of a module section, the summing circuits 23 and 123 are coupled to an electronic part of the type described, connected to the output 24 of the summing circuit 23, referring to FIG. 3.

FIG. 8 shows an example of a filter 16 suitable for use in the module described. The filter comprises a transparent plate 36 coated with a filtering layer 37. FIG. 9a shows an example of the transmission T of such a filtering layer, as a function of the wavelength λ. In the example shown, the filtering layer has two narrow band transmission ranges $T_1$ and $T_2$. The layer-coated plate according to FIG. 8 exhibits a number of holes 38. The holes result in the filter becoming partly transparent also to wavelengths outside the transmission ranges $T_1$ and $T_2$, as shown in Figure 9b. By using a filter with the transmission characteristics shown in FIG. 9b, the laser warning device can be given a certain lower sensitivity also outside the two transmission ranges $T_1$ and $T_2$ at the price of a lower loss in sensitivity within the transmission ranges.

The laser warning module described exhibits high flexibility within the scope of a module and thus widens the range of applications. Among others, the characteristics of the filter incorporated and the associated optics can be varied. One filter can possibly be omitted.

I claim:

1. A laser warning device for sector-by-sector surveillance of the air space, said device comprising:
a plurality of module sections such that each surveyed sector is coupled through an optical antenna and an optical buffer to a module section, each said module section including:
an optical fiber input for receiving a beam of light rays transmitted through the optical fiber;
means for dividing the transmitted beam of light rays into at least a first and a second part beam;
at least a first and a second optical fiber path for transmitting said first and second part beam respectively;
means provided in said first fiber path for filtering the first part beam of light rays to a narrow band beam of light rays;
first detecting means for detecting the filtered first part beam and delivering a signal representing the amplitude of the filtered first part beam;
second detecting means for detecting the second part beam and for delivering a signal representing the amplitude of the second part beam; and
an electronic unit including summing means for summing the signals delivered by said first and second detecting means and threshold means, said electronic unit comparing the summed signal value with a threshold value, the result of the comparison indicating presence or absence of laser light, said electronic unit being coupled to a central evaluating unit.

2. A laser warning device according to claim 1, wherein a number of module sections are combined to form a module, the module having a common connection to the central evaluating unit.

3. A laser warning device according to claim 1, wherein the optical filter has a pass light band within the range of wavelengths of 0.5–1.1 μm.

4. A module suitable for use in a laser warning device for sector-by-sector surveillance of the air space, by a plurality of modules such that each surveyed sector is coupled through an optical antenna and an optical buffer to a module, each said module including:
an optical fiber input for receiving a beam of light rays transmitted through the optical fiber;
means for dividing the transmitted beam of light rays into at least a first and a second part beam;
at least a first and a second optical fiber path for transmitting said first and second part beam respectively;
means provided in said first fiber path for filtering the first part beam of light rays to a narrow band beam of light rays;
first detecting means for detecting the filtered first part beam and delivering a signal representing the amplitude of the filtered first part beam;
second detecting means for detecting the second part beam and for delivering a signal representing the amplitude of the second part beam; and
an electronic unit including summing means for summing the signals delivered by said first and second detecting means and threshold means, said electronic unit comparing the summed signal value with a threshold value, the result of the comparison indicating presence or absence of laser light.

5. A module according to claim 4, wherein said electronic unit is coupled to a central evaluating unit.

6. A device according to claim 1, wherein said filtering means in said first fiber path includes a first lens arrangement which converts the first part beam to a parallel beam and wherein said first detecting means for detecting the filtered part beam comprise a detector and a second lens arrangement, said second lens arrangement refracting the incident, filtered and parallel first part beam towards said first detecting means.

7. A module according to claim 4, wherein said filtering means in said first fiber path includes a first lens arrangement which converts the first part beam to a parallel beam and wherein said first detecting means for detecting the filtered part beam comprise a detector and a second lens arrangement, said second lens arrangement refracting the incident, filtered and parallel first part beam towards said first detecting means.

8. A device according to claim 1, wherein said second detecting means comprises a detector and an attenuator arranged in front of said detector.

9. A module according to claim 4, wherein said second detecting means comprises a detector and an attenuator arranged in front of said detector.

10. A device according to claim 1, wherein at least one of the module sections comprises a dichroic mirror arranged between the optical fiber input of the module section and said means for filtering of the first part beam, said dichroic mirror transmitting the beam of light rays belonging to the range on one side of a limit wavelength towards said means for filtering and reflecting the beam of light rays belonging to the range on the other side of the limit wavelength towards further means for filtering.

11. A device according to claim 1, wherein said means for filtering includes a filter with a number of narrow band transmission ranges.

12. A module according to claim 12, wherein said filter has one narrow band transmission range.

* * * * *